US008957123B2

United States Patent
Lazraq et al.

(10) Patent No.: US 8,957,123 B2
(45) Date of Patent: Feb. 17, 2015

(54) PROCESS FOR MAKING LOW DENSITY HIGH RESILIENCY FLEXIBLE POLYURETHANE FOAM

(75) Inventors: Issam Lazraq, Terneuzen (NL); Helmut Stegt, Ahlen (DE); Allan James, Oxford, MI (US); Stephen R. Burks, Essexville, MI (US)

(73) Assignee: Dow Global Technologies Inc, Midland, MI (US)

( * ) Notice: Subject to any disclaimer, the term of this patent is extended or adjusted under 35 U.S.C. 154(b) by 192 days.

(21) Appl. No.: 13/876,620

(22) PCT Filed: Dec. 7, 2010

(86) PCT No.: PCT/US2010/059169
§ 371 (c)(1),
(2), (4) Date: Mar. 28, 2013

(87) PCT Pub. No.: WO2012/044338
PCT Pub. Date: Apr. 5, 2012

(65) Prior Publication Data
US 2013/0184368 A1    Jul. 18, 2013

Related U.S. Application Data

(60) Provisional application No. 61/388,684, filed on Oct. 1, 2010.

(51) Int. Cl.
*C08G 18/28* (2006.01)

(52) U.S. Cl.
USPC ........... 521/167; 521/130; 521/164; 521/174; 521/175; 521/176

(58) Field of Classification Search
CPC ........... C08G 18/4812; C08G 18/4816; C08G 18/482; C08G 18/4841; C08G 18/4866; C08G 18/5021; C08G 2101/0008; C08G 65/2609; C08J 9/04; C08J 9/08; C08J 2205/06
USPC .................. 521/130, 164, 167, 174, 175, 176
See application file for complete search history.

(56) References Cited

U.S. PATENT DOCUMENTS

| 7,361,695 | B2 * | 4/2008 | Tu et al. .................. 521/128 |
| 7,588,121 | B2 * | 9/2009 | Sasaki et al. .............. 181/180 |
| 8,883,934 | B2 * | 11/2014 | Stegt et al. ................ 525/460 |
| 2007/0112086 | A1 * | 5/2007 | Matsumoto et al. .......... 521/172 |
| 2007/0142607 | A1 * | 6/2007 | Harasin et al. ............ 528/44 |
| 2007/0213420 | A1 * | 9/2007 | Kimura et al. ............. 521/99 |
| 2007/0238795 | A1 * | 10/2007 | Drumright et al. .......... 521/128 |

* cited by examiner

Primary Examiner — John Cooney
(74) Attorney, Agent, or Firm — M. Robert Christy (57) ABSTRACT

A process for producing resilient, flexible polyurethane foams that function well in noise and vibration absorption applications for vehicle applications that are made from a blend of polyols (i) and an isocyanate (ii), wherein the blend of polyols (i) comprises a mixture of polyether polyols (i.a) that each has a hydroxyl equivalent weight of from 1200 to 3000 and at least 70% primary hydroxyl groups, from 5 to 80% by weight of the ethylene oxide-capped polypropylene oxides are nominally difunctional, from 0.5 to 20% by weight of the ethylene oxide-capped polypropylene oxides have a nominal functionality of four or higher, and the balance of the ethylene oxide-capped polypropylene oxides, but not less than 1.5% by weight thereof, are nominally trifunctional; an autocatalytic polyol (i.b) having a functionality in the range of 2 to 8 and a hydroxyl number in the range of 15 to 200, wherein said autocatalytic polyol compound comprising at least one tertiary amine group; and a low unsaturation polyol (i.c) having a functionality equal to or greater than 2, a hydroxyl equivalent weight of from 1800 to 2800, and a total unsaturation value of equal to or less than 0.06 meq/g.

11 Claims, 2 Drawing Sheets

PROCESS FOR MAKING LOW DENSITY HIGH RESILIENCY FLEXIBLE POLYURETHANE FOAM

CROSS REFERENCE STATEMENT

This application claims benefit of U.S. Provisional Application Ser. No. 61/288,684 filed on Oct. 1, 2010, which is incorporated herein by reference.

FIELD OF THE INVENTION

The present invention relates to a process for making low density high resiliency flexible polyurethane foam having low organic compound emissions and reduced de-mold times. Said foams are particularly suited for sound and vibration management in motor vehicles.

BACKGROUND OF THE INVENTION

Noise and vibration management is a significant issue for vehicle manufacturers, as cabin noise is a major factor in the comfort experience of automotive passengers. Therefore, noise and vibration abatement measures are routinely incorporated into motor vehicles. These abatement measures often utilize flexible polyurethane foams. However, such foams typically are called upon to perform one or more functional purpose that can not be compromised at the expense of noise and vibration absorption.

Flexible polyurethane foam is based on the polymerization of polyether and/or polyester polyols with isocyanates in the presence of water acting as blowing agent. These systems generally contain additional components such as cross-linkers, chain extenders, surfactants, cell regulators, stabilizers, antioxidants, flame retardant additives, fillers, and typically catalysts such as tertiary amines and organometallic salts. Levels of the catalysts in the polyurethane formulation are adjusted during the foam manufacturing process to optimize processing as well as final foam properties such as cell structure, density, hardness, resiliency, airflow, elongation, tear resistance, aging, and emission characteristics.

In addition to performance properties, cost is another consideration as to material selection as manufacturers are always trying to reduce their production costs. One way to do with this with foam products is to reduce their density, thus reducing the amount of raw materials needed to prepare a part with a given volume. Some manufacturers now desire to reduce the foam density of these products by about 10%, from the range of about 44-50 kilogram per cubic meter ($kg/m^3$) down to about 36-42 $kg/m^3$. The simplest and most economical approach to accomplish this is to increase the amount of water in the formulation. Water reacts with isocyanate groups to release carbon dioxide, which acts as the blowing gas. By increasing the amount of water in the formulation, more carbon dioxide can be formed, provided that there are enough isocyanate groups to react with the additional water.

The reaction between water and isocyanate groups also extends the growing polymer chains by creating urea linkages between polyisocyanate molecules. The water-polyisocyanate reaction by itself forms a very rigid and brittle polymer. To overcome this brittleness and produce a flexible and resilient material, high equivalent weight polyols are added to the foam formulation. Hydroxyl groups on the polyols react with isocyanate groups to form urethane linkages. The urethane-forming reaction that takes place between the polyol and the isocyanate groups therefore is in competition with the water-isocyanate reaction. These reactions must be balanced so the construction of high molecular weight polymer chains and the generation of carbon dioxide proceed in the proper sequence. As the amount of water is increased, relative to the amount of polyols, the balance between these reactions becomes difficult to maintain. High water systems tend to become sensitive to small variations in processing conditions, such as, for example, small variations in the amount of catalysts or component or mold temperatures. It therefore becomes increasingly difficult to produce good quality foam consistently, in a manufacturing setting, with these high water formulations. The foams tend to have large voids, and areas of incomplete mold filling, especially at the end of the shot. In addition, there is often a large variation in foam quality from part to part, which again indicates the instability of the processing. At higher densities, these problems can be overcome to some extent by overpacking the mold (i.e., injecting more of the foam formulation than is needed to barely fill the mold). But as the foam density is reduced, little or no overpacking can take place as the molded foam density more closely approaches the so-called minimum fill density of the foam formulation.

Another way to reduce the cost of a foamed article is by improving (i.e., reducing) the cycle time for its production. The shorter the cycle time, the lower the cost of the foam article. One approach to accomplish shorter cycle times is to reduce the cure time, sometimes referred to as de-mold time, for the foam. To reach faster foam cure time high reactivity profile is needed by increasing the concentration of the catalysts. However, the reactive type of catalysts necessary for the low emission technology are mainly mono-functional in nature; which affect the chain growth during the polymerization process as they may act as chain inhibitors stopping the poly-addition of reactive species. Thus, the resulted polymeric network contains high concentration of short chain polymers and/or oligomers adversely affecting the main required characteristics needed for material's application such as the processing behavior or the targeted mechanical properties. In addition, the high concentration of catalysts may affect negatively the emissions results of the molded foam.

It would be desirable to provide a composition for producing resilient, flexible polyurethane foam which have a low density (at most 42 $kg/m^3$), good sound absorption properties, low organic compound emissions, process easily, and de-mold quickly.

BRIEF SUMMARY OF THE INVENTION

The present invention is a process for preparing such a resilient, flexible polyurethane, comprising the steps of:
  a providing a polyol blend (i) comprising:
    i.a from 5 to 70, preferably from 15 to 70 weight % of a polyol mixture (i.a) of ethylene oxide-capped polypropylene oxides each having a hydroxyl equivalent weight of from 1200 to 3000, preferably 1700 to 2200 with a nominal functionality of from 6 to 8, and containing at least 70% primary hydroxyl groups, wherein from 5 to 80% by weight of the ethylene oxide-capped polypropylene oxides are nominally difunctional, from 0.5 to 20% by weight of the ethylene oxide-capped polypropylene oxides have a nominal functionality of four or higher, and the balance of the ethylene oxide-capped polypropylene oxides, but not less than 1.5% by weight thereof, are nominally trifunctional;
    i.b from 1 to 20, preferably from 4 to 10 weight % of one or more autocatalytic polyol compound (i.b) having a functionality in the range of 2 to 8 and a hydroxyl number in the range of 15 to 200, wherein said autocatalytic polyol compound comprising at least one tertiary amine group, and said autocatalytic polyol being an amine initiated polyol obtained by alkoxylation of at least one initiator molecule selected from the group consisting of 2,2'-diamino-N-methyldiethylamine, 2,3-diamino-N-methyl-ethyl-propylamine, preferably 3,3'-diamino-N-methyldipropylamine, or a mixture thereof;

i.c from 25 to 80, preferably from 40 to 70 weight % of a low unsaturation polyol (i.c) having a functionality equal to or greater than 2, a hydroxyl equivalent weight of from 1800 to 2800, and a total unsaturation value of equal to or less than 0.06, preferably equal to or less than 0.04 meq/g;

wherein weight percents are based on the total weight of the polyol blend (i);

b providing one or more organic polyisocyanate (ii);

c forming a reactive blend (iii) by continuously merging said polyol blend (i) and said organic polyisocyanate (ii) in the presence of a blowing agent and, optionally, one or more additive;

and d subjecting the resulting reactive blend (iii) to conditions sufficient to cure the reactive blend to form a resilient, flexible polyurethane foam.

In one embodiment, the present invention is the process to make a resilient, flexible polyurethane foam disclosed herein above wherein said foam has a density as determined by ASTM D3574 of equal to or less than 42 kg/m³.

In another embodiment, the present invention is the process to make a resilient, flexible polyurethane foam disclosed herein above further comprising the steps:

c.1 foaming the reactive blend (iii) in a closed mold;

e opening the closed mold, and f removing the resilient, flexible polyurethane foam, wherein step c.1 occurs after step c and before step d and steps e and f occur sequentially after step d, such that the resilient, flexible polyurethane foam has a de-mold time of at most 55 seconds.

In yet another embodiment, the present invention is the process to make a resilient, flexible polyurethane foam by the process disclosed herein above wherein said foam has a compression set as determined by ASTM D3574 of equal to or less than 15%. In yet another embodiment, the present invention is the process to make a resilient, flexible polyurethane foam by the process disclosed herein above wherein said foam has a volatile organic compounds level (VOC) of equal to or less than 100 µg/gm and a fugitive organic gas level (FOG) of equal to or less then 250 µg/gm, VOC and FOG values determined according to VDA 278.

In a most preferred embodiment, the present invention is the process to make a resilient, flexible polyurethane foam disclosed herein above wherein said foam is used in an automobile noise and vibration-absorbing application, preferably in automotive seating and automotive interior parts such as dash boards, headliners, instrument panels trim, underlays, and mats.

DETAILED SUMMARY OF THE INVENTION

The process of the present invention utilizes a (i) polyol blend comprising (i.a) a mixture of polyols, (i.b) one or more autocatalytic polyol compound, and (i.c) a low unsaturation polyol. The polyol blend (i) is combined with an organic polyisocyanate (ii) to form a reactive blend (iii) by continuously merging said polyol blend (i) and said organic polyisocyanate (ii) in the presence of a blowing agent and, optionally, one or more additive. The resulting reactive blend (iii) is subjected to conditions sufficient to cure the reactive blend (iii) to form a resilient, flexible polyurethane foam. In a preferred embodiment of the process of the present invention, the foaming of the reactive blend takes place in a closed mold, wherein once the resilient, flexible polyurethane foam has cured, the mold is opened and the resilient, flexible polyurethane foam is removed from the mold.

The polyol mixture (i.a) contains at least three different ethylene oxide-capped polypropylene oxides. Each of them has a hydroxyl equivalent weight of at least 1200, preferably at least 1500, more preferably at least 1700, up to 3000, preferably up to 2500 and more preferably up to 2200. The constituent polyols in the mixture preferably each have hydroxyl equivalent weights that are within 300 of each other. Each of them has at least 70% primary hydroxyl groups, preferably at least 75% primary hydroxyl groups, the rest being secondary hydroxyl. The proportion of primary hydroxyl groups may be up to 100%, or up to 90%. The ethylene oxide-caps are blocks of polymerized oxyethylene which may constitute from 5 to 30% by weight of the polyol in each case.

From 5 to 80% of the weight of the ethylene oxide-capped polypropylene oxides are nominally difunctional. By "nominally" difunctional, it is meant that the polyol is prepared from a difunctional starter compound. It is well-known that polypropylene oxide forms some amount of monofunctional impurities when it is polymerized, particularly when polymerized in an anionic polymerization process under strongly basic conditions. As a result, the actual average functionalities of poly(propylene oxide)s tend to be somewhat lower than the nominal functionalities. For purposes of this invention, functionalities are all nominal functionalities, meaning that the functionality of a polyol is considered to be the same as that as its starter compound.

The difunctional ethylene oxide-capped polypropylene oxide preferably constitutes from 5 to 25% of the total weight of the ethylene oxide-capped polypropylene oxides, and still more preferably from 5 to 15% by weight thereof.

From 0.5 to 20%, preferably from 1 to 15% and still more preferably from 1 to 5% of the weight of the ethylene oxide-capped polypropylene oxides have nominal functionalities of four or more. The functionally of these components may be 8 or even higher, with preferred functionalities being from six to eight.

The balance of the ethylene oxide-capped polypropylene oxide polyols are nominally trifunctional. The trifunctional polyol should constitute at least 1.5% of the mixture, and preferably constitutes from 10 to 95%, more preferably from 80 to 95% thereof by weight.

The polyol mixture can be prepared by separately manufacturing the constituent polyols and blending them together. It is also possible to product the mixture (or subcombinations of the constituent polyols) by alkoxylating a mixture of initiator compounds. Such a mixture of starter compounds may be a mixture of a difunctional starter and a trifunctional starter; a mixture of a difunctional starter with a starter having a functionality of four or more; a mixture of a trifunctional starter and a starter having a functionality of four or more; or a mixture of a difunctional starter, a trifunctional starter and a starter having a functionality of four or more. High (4+) functionality starters in particular often are mixed with di- or trifunctional starters, in order to facilitate the polymerization process.

The polyol mixture (i.a) is present in the polyol blend (i) in an amount equal to or greater than 5 weight %, preferably equal to or greater than 10 weight %, and more preferably equal to or greater than 15 weight % based on the total weight of the polyol blend (i). The polyol mixture (i.a) is present in the polyol blend (i) in an amount equal to or less than 70 weight %, preferably equal to or less than 60 weight %, more preferably equal to or less than 50 weight %, and even more preferably equal to or less than 40 weight % based on the total weight of the polyol blend (i).

It has been found that foam formulations that include the polyol blend (i) comprising the polyol mixture (i.a) of the invention tend to process easily, even in high water formulations which produce foams of 42 kg/m³ density or less. The reason for this is not understood, and is unexpected. The phenomenon does not appear to be related directly to the average functionality of the polyol mixture, as this can vary quite substantially, from as low as about 2.3 to well over 3.0, with good results, provided that all three polyol types are present. The phenomenon may be related to a slightly slower reaction rate that has been observed when the polyol mixture is used to prepare certain flexible foams. This, too, is quite surprising, as the reactivities of the individual polyols are such that the mixture would not be expected to react more slowly than mixtures of only the diol and the triol components. Nonetheless, foam formulations containing the polyol mixture can consistently produce good quality parts, even at densities in the range of from 36 to 42 kg/m³, and even when there is little overpacking of the mold.

In addition, the foams perform well in noise and vibration absorption applications.

The polyol blend (i) further comprises an autocatalytic polyol compound (i.b) such as those disclosed in U.S. Pat. No. 7,361,695, which is herein incorporated by reference in its entirety. The autocatalytic polyol compound (i.b) is a polyol containing at least one tertiary amine group having a functionality of 1 to 8, preferably 2 to 8, more preferably 2 to 6, and a hydroxyl number of from 15 to 200.

Polyol (i.b) is an amine initiated polyol obtained either by alkoxylation of at least one initiator molecule of (i.b.1), (i.b.2), (i.b.3), (i.b.4), (i.b.5), (i.b.6), (i.b.7), or (i.b.8) I wherein (i.b.1) is:

wherein n is an integer from 2 to 12, and
R is a $C_1$ to $C_3$ alkyl group;
(i.b.2) is a compound which contains a dialkylylamino group pendant to a polyhydroxy or polyamino molecule of Formula II:

where is R is a $C_1$ to $C_3$ alkyl group;
R' at each occurrence is a $C_1$ to $C_3$ alkyl group;
s is an integer from 1 to 3;
m is an integer from 1 to 12;
A is nitrogen or oxygen;
p is 2 when A is nitrogen and is 1 when A is oxygen; and
w is 0, 1, or 2;
(i.b.3) is a dimethylamino group pendant to a monohydroxy or monamino structure of Formula III where $R^2$ is $NR'_2$ or a 5 substituted, 1-aza-3,7-dioxabicyclo [3.3.0]octane;
R, R', A, and p, are as previously defined;
y is 0 to 12; and
x is 0, 1 or 2;
(i.b.4) is a bis-N-substituted piperazine wherein the substitution is amino- or hydroxy-substituted $C_1$ to $C_6$ linear or branched alkyl;
(i.b.5) is a compound of Formula IV:

where $R^3$ a $C_5$ to $C_6$ cycloalkyl group and R is as previously defined;
(i.b.6) is a compound of Formula V:

where n at each occurrence is independently an integer from 2 to 12;
B at each occurrence is independently oxygen, nitrogen or hydrogen, with the proviso that only one of B can be hydrogen at one time;
R is a $C_1$ to $C_3$ alkyl group;
p is equal to 0 when B is hydrogen, is 1 when B is oxygen and is 2 when B is nitrogen;
(i.b.7) is a compound of Formula VI:

where $R^2$ and y are as previously defined;
(i.b.8) is one molecule of Formula VII:

where R' at each occurrence is independently a $C_1$ to $C_3$ alkyl group;
R, s and w are as previously defined;
x is an integer from 0 to 2;
m and n are independently integers from 1 to 12;
q is an integer from 1 to 3;
A is nitrogen or oxygen;
p is 2 when A is nitrogen and is 1 when A is oxygen;
or (i.b) is (i.b.9) a compound which contains an alkyl amine within the polyol chain or a di-alkyl amino group pendant to the polyol chain wherein the polyol chain is obtained by copolymerization of at least one monomer containing an alkylaziridine or N,N-dialkyl glycidylamine with at least one alkylene oxide, wherein the alkyl or di-alkyl moiety of the amine is a $C_1$ to $C_3$ alkyl;
or (i.b) is a hydroxyl-tipped prepolymer obtained from the reaction of an excess of (i.b.1), (i.b.2), (i.b.3), (i.b.4), (i.b.5), (i.b.6), (i.b.7), (i.b.8) or (i.b.9) with a polyisocyanate;

or (i.b) is (i.b.10) a blend selected from (i.b.1), (i.b.2), (i.b.3), (i.b.4), (i.b.5), (i.b.6), (i.b.7), (i.b.8) or (i.b.9) or hydroxyl-terminated prepolymers obtained from polyols based on initiators (i.b.1)-(i.b.8).

The autocatalytic polyols containing bonded tertiary amine groups as disclosed herein above are catalytically active and accelerate the addition reaction of organic polyisocyanates with polyhydroxyl or polyamino compounds and the reaction between the isocyanate and the blowing agent such as water or a carboxylic acid or its salts.

In one embodiment of Formula I, R is methyl. Preferably n in Formula I is an integer of 2 to 4. In a preferred embodiment, R is methyl and n is an integer of 2 to 4. Compounds of Formula I can be made by standard procedures known in the art. Examples of commercially available compounds of Formula I include N-methyl-1,2-ethanediamine and N-methyl-1,3-propanediamine.

In one embodiment of Formula II, R is methyl. Preferably R' at each occurrence of Formula II is an alkyl group with the same number of carbon atoms. Products of formula II are made using standard procedures known in the art or are commercially available. For example, N,N-dimethyl-tris(hydroxymethyl)aminomethane can be made by methylation of tris-amino, or tris(hydroxymethyl)aminomethane; an aminoalcohol commercially available from ANGUS Chemical.

Similarly for compounds of Formula III, R is preferably methyl and R' at each occurrence is an alkyl with the same number of carbon atoms. Representative examples of (i.b.3) include dimethylaminoethanolamine, hydroxymethyl oxazolidine.

Example compounds of (i.b.4) are diamino or dihydroxy derivatives of piperazine such as N-bis(2-amino-isobutyl)-piperazine. Compounds of (i.b.4) are commercially available or can be made by standard procedures known in the art.

A representative example of (i.b.5) and Formula IV is N-methyl-cyclohexylamine.

Example compounds of (i.b.6) include 3,3'-diamino-N-methyldipropylamine; 2,2'-diamino-N-methyldiethylamine; and 2,3-diamino-N-methyl-ethyl-propylamine.

An example compound of (i.b.7) is N,N-dimethylaminopropylamine (or DMAPA).

Representative compounds of Formula VII (i.b.8) are disclosed in U.S. Pat. No. 5,476,969, the disclosure of which is incorporated herein by reference. Preferred compounds of Formula VII are when x is 0 or 2; s is 3 or 1; m is less than 6; q is 1 and A is nitrogen.

The autocatalytic polyol compound (i.b) is present in the polyol blend (i) in an amount equal to or greater than 1 weight %, preferably equal to or greater than 2 weight %, more preferably equal to or greater than 3 weight %, and even more preferably equal to or greater than 4 weight % based on the total weight of the polyol blend (i). The autocatalytic polyol compound (i.b) is present in the polyol blend (i) in an amount equal to or less than 20 weight %, preferably equal to or less than 15 weight %, more preferably equal to or less than 10 weight %, and even more preferably equal to or less than 5 weight % based on the total weight of the polyol blend (i).

The polyol blend (i) further comprises a low unsaturation polyol (i.c) such as those disclosed in U.S. Pat. No. 7,588,121, which is herein incorporated by reference in its entirety. Preferably, the low unsaturation polyol (i.c) is a polyoxyalkylene polyol. In one embodiment, the low unsaturation polyol (i.c) used in the present invention is a polyoxyalkylene polyol having at least two hydroxyl groups on the average, having a functionality of 1 to 8, preferably 2 to 8, more preferably 2 to 6, and having a molecular weight per hydroxyl group of from 1,800 to 2,800 and a total unsaturation value of at most 0.06 meq/g.

Preferably, the molecular weight per hydroxyl group of the low unsaturation polyol (i.c) is from 1,800 to 2,800, preferably from 1,850 to 2,500.

The low unsaturation polyol (i.c) has a total unsaturation value equal to or less than 0.06 meq/g. The total unsaturation value is more preferably equal to or less than 0.05 meq/g, further preferably equal to or less than 0.04 meq/g, most preferably equal to or less than 0.03 meq/g.

In one embodiment, the low unsaturation polyol (i.c) having total unsaturation value equal to or less than 0.06 meq/g, is obtained by employing a cesium hydroxide or a composite metal cyanide complex, particularly preferably a composite metal cyanide complex, as the catalyst for ring opening addition polymerization of an alkylene oxide. As the composite metal cyanide complex catalyst, a known catalyst may be used. A complex containing zinc hexacyanocobaltate as the main component is preferred, and one having an ether and/or alcohol as an organic ligand is further preferred. As the organic ligand, monoethylene glycol mono-tert-butyl ether or tert-butyl alcohol or glyme (ethylene glycol dimethyl ether) may, for example, be preferred.

A preferred the low unsaturation polyol (i.c) is a polyoxyalkylene polyol that is obtained by ring opening addition polymerization of an alkylene oxide in the presence of a composite metal cyanide complex catalyst or a cesium hydroxide catalyst, and an initiator.

The average number of hydroxyl groups in the low unsaturation polyol (i.c) is at least 2. The low unsaturation polyol (i.c) is a single use of one type or a mixture of polyols having molecular weights per hydroxyl group with an average of from 1,800 to 2,800 and total unsaturation values of at most an average of 0.06 meq/g. Otherwise, it may be one produced by using such a mixture as an initiator. The average number of hydroxyl groups is preferably from 2 to 8, more preferably from 2 to 4, further preferably from 2.2 to 3.9, most preferably from 2.4 to 3.7.

Further, the low unsaturation polyol (i.c) is preferably one having polyoxyethylene block chains at the terminals, particularly preferably one having from 5 to 25 mass % of such block chains.

The low unsaturation polyol compound (i.c) is present in the polyol blend (i) in an amount equal to or greater than 25 weight %, preferably equal to or greater than 40 weight %, more preferably equal to or greater than 50 weight %, and even more preferably equal to or greater than 60 weight % based on the total weight of the polyol blend (i). The low unsaturation polyol compound (i.c) is present in the polyol blend (i) in an amount equal to or less than 80 weight %, preferably equal to or less than 75 weight %, more preferably equal to or less than 70 weight %, and even more preferably equal to or less than 65 weight % based on the total weight of the polyol blend (i).

The resulting polyol blend (i) is useful for preparing a variety of polyurethane polymers, through reaction with one or more organic polyisocyanates (ii). "polyurethane" polymers is used herein as a shorthand term to denote polymers that have urethane groups, and optionally other groups such as urea groups. The particular manufacturing process used to prepare the polyurethane is not considered to be critical to the invention. Therefore, a variety of molding, casting, bulk polymerization, dispersion or solution polymerization and like methods can be used. Similarly, a wide range of polyurethane products can be prepared, including non-cellular elastomers, microcellular elastomers, structural foams, rigid insulating foams, viscoelastic foams, flexible foams (both molded or slabstock types), reinforced polymers of various types, and the like. Foaming processes such as slabstock foam manufacturing processes and, especially, molded foam manufacturing processes are processes of particular interest. Resilient, flexible polyurethane foams are of most interest.

The one or more organic polyisocyanate (ii) which reacts with the polyol blend (i) to make the polyurethane may be an aromatic, cycloaliphatic, aliphatic isocyanate, or mixtures thereof. Aromatic polyisocyanates are preferred and, among these, diphenylmethane diisocyanate (MDI) and/or a polymethylene polyphenylisocyanate (PMDI) are preferred on the basis of generally greater reactivity, availability and cost. MDI may be the 2,4'-isomer, the 4,4'-isomer, or some mixture thereof. PMDI is generally a mixture of one or polymethylene polyphenylisocyanates and some MDI; the MDI portion of the mixture may be either or both of the 2,4- and the 4,4'-isomers.

The amount of polyisocyanate that is used to make resilient flexible foam typically is sufficient to provide an isocyanate index of from 0.6 to 1.5, preferable 0.6 to 1.20, although wider ranges can be used in special cases. A preferred range is from 0.7 to 1.05 and a more preferred range is from 0.75 to 1.05.

The reaction between the polyol blend (i) and the one or more organic polyisocyanate (ii) can be performed in the presence of various types of other materials, as may be useful in the particular manufacturing process that is used or to impart desired characteristics to the resulting polymer. These include, for example, catalysts, blowing agents, cell openers, surfactants, crosslinkers, chain extenders, fillers, colorants, fire retardants, pigments, antistatic agents, reinforcing fibers, antioxidants, preservatives, acid scavengers, and the like.

The polyol blend (i) of the invention is useful in making resilient flexible polyurethane foam. It offers particular advantages in high water formulations that contain from 4 to 7 weight %, especially from 4.5 to 6 weight % based on the total weight of the polyol blend (i). Polyurethane foams are made from these high water formulations by reacting the polyol blend (i) with one or more organic polyisocyanate (ii) in the presence of the water. The foam can be made in a slabstock process or in a closed mold. Closed mold molding processes are preferred to make products such as automotive seating, dash boards, instrument panels, other automotive interior trim parts, and especially sound deadening applications such as carpets, trunk isolation, dash mats and engine encapsulation.

One or more various other components can be present in a foam formulation for making resilient, flexible foam, in addition to the aforementioned polyol blend (i) including water and organic polyisocyanate (ii).

In addition to the autocatalytic polyol which may act as a catalyst, one or more additional catalyst may be present in the foam formulation of the present process. One preferred type of catalyst is a tertiary amine catalyst. The tertiary amine catalyst may be any compound possessing catalytic activity for the reaction between a polyol and an organic polyisocyanate and at least one tertiary amine group. Representative tertiary amine catalysts include trimethylamine, triethylamine, dimethylethanolamine, N-methyl-morpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, bis(2-dimethylaminoethyl) ether, morpholine,4,4'-(oxydi-2,1-ethanediyl)bis, triethylenediamine, pentamethyl diethylene triamine, dimethyl cyclohexyl amine, N-acetyl N,N-dimethyl amine, N-coco-morpholine, N,N-dimethyl aminomethyl N-methyl ethanol amine, N,N,N'-trimethyl-N'-hydroxyethyl bis(aminoethyl) ether, N,N-bis(3-dimethylaminopropyl)N-isopropanolamine, (N,N-dimethyl) amino-ethoxy ethanol, N,N,N',N'-tetramethyl hexane diamine, 1,8-diazabicyclo-5,4,0-undecene-7, N,N-dimorpholinodiethyl ether, N-methyl imidazole, dimethyl aminopropyl dipropanolamine, bis(dimethylaminopropyl)amino-2-propanol, tetramethylamino bis (propylamine), (dimethyl(aminoethoxyethyl))((dimethyl amine)ethyl)ether, tris(dimethylamino propyl) amine, dicyclohexyl methyl amine, bis(N,N-dimethyl-3-aminopropyl) amine, 1,2-ethylene piperidine and methyl-hydroxyethyl piperazine The foam formulation may contain one or more other catalysts, in addition to or instead of the tertiary amine catalyst mentioned before. Of particular interest among these are tin carboxylates and tetravalent tin compounds. Examples of these include stannous octoate, dibutyl tin diacetate, dibutyl tin dilaurate, dibutyl tin dimercaptide, dialkyl tin dialkylmercapto acids, dibutyl tin oxide, dimethyl tin dimercaptide, dimethyl tin diisooctylmercaptoacetate, and the like.

Catalysts are typically used in small amounts. For example, the total amount of catalyst used may be 0.0015 to 5 weight %, preferably from 0.01 to 1 weight % based on the total weight of the polyol blend (i). Organometallic catalysts are typically used in amounts towards the low end of these ranges.

The foamable composition may contain a crosslinker, which preferably is used, if at all, in small amounts, to 2 weight %, up to 0.75 weight %, or up to 0.5 weight % based on the total weight of the polyol blend (i). The crosslinker contains at least three isocyanate-reactive groups per molecule and has an equivalent weight, per isocyanate reactive group, of from 30 to about 125 and preferably from 30 to 75. Aminoalcohols such as monoethanolamine, diethanolamine and triethanolamine are preferred types, although compounds such as glycerine, trimethylolpropane and pentaerythritol also can be used.

A surfactant is preferably included in the foam formulation to help stabilize the foam as it expands and cures. Examples of surfactants include nonionic surfactants and wetting agents such as those prepared by the sequential addition of propylene oxide and then ethylene oxide to propylene glycol, solid or liquid organosilicones, and polyethylene glycol ethers of long chain alcohols. Ionic surfactants such as tertiary amine or alkanolamine salts of long chain alkyl acid sulfate esters, alkyl sulfonic esters and alkyl arylsulfonic acids can also be used. The surfactants prepared by the sequential addition of propylene oxide and then ethylene oxide to propylene glycol are preferred, as are the solid or liquid organosilicones. Examples of useful organosilicone surfactants include commercially available polysiloxane/polyether copolymers such as TEGOSTAB™ B-8729, and B-8719LF available from Goldschmidt Chemical Corp., and NIAX™ L2171 surfactant from Momentive Performance Materials. Non-hydrolyzable liquid organosilicones are more preferred. When a surfactant is used, it is typically present in an amount of 0.0015 to 1 weight % based on the total weight of the polyol blend (i).

A cell opener preferably is present in the foam formulation. The cell opener functions during the polymerization reaction to break cell walls and therefore promote the formation of an open cell structure. A high open cell content (at least 25% by number, preferably at least 50%) is usually beneficial for foams that are used in noise and vibration absorption applications. A useful type of cell opener includes ethylene oxide homopolymers or random copolymers of ethylene oxide and a minor proportion of propylene oxide, which have a molecular weight of 5000 or more. These cell openers preferably have a hydroxyl functionality of at least 4, more preferably at least 6. Cell openers are preferably used in amounts from about 0.5 to about 5 weight % based on the total weight of the polyol blend (i).

A chain extender, by which it is meant a compound having exactly two isocyanate-reactive groups and an equivalent weight per isocyanate-reactive group of up to 499, preferably up to 250, also may be present. Chain extenders, if present at all, are usually used in small amounts, such as up to 10, preferably up to 5 and more preferably up to 2 weight % based on the total weight of the polyol blend (i). Examples of suitable chain extenders include ethylene glycol, diethylene glycol, triethylene glycol, propylene glycol, dipropylene glycol, tripropylene glycol, 1,4-dimethylolcyclohexane, 1,4-butane diol, 1,6-hexane diol, 1,3-propane diol, diethyltoluene diamine, amine-terminated polyethers such as JEFFAMINE™ D-400 from Huntsman Chemical Company, amino ethyl piperazine, 2-methyl piperazine, 1,5-diamino-3-methyl-pentane, isophorone diamine, ethylene diamine, hexane diamine, hydrazine, piperazine, mixtures thereof and the like.

The foaming reaction may be conducted in the presence of a filler, which reduces overall cost and may improve flame resistance, load bearing and other physical properties to the product. The filler may constitute up to about 50%, of the total weight of the polyurethane foam formulation (i.e., the combined weight of the polyol blend (i) and the organic isocyanate (ii)). Suitable fillers include talc, mica, montmorillonite, marble, barium sulfate (barytes), milled glass granite, milled glass, calcium carbonate, aluminum trihydrate, carbon, aramid, silica, silica-alumina, zirconia, talc, bentonite, antimony trioxide, kaolin, coal based fly ash and boron nitride.

Resilient, flexible foam can be made in accordance with the invention in a slabstock process or in a closed mold molding process. Slabstock foam is formed as a large bun which is cut into the required shape and size for use. Closed mold molding processes can be either so-called hot molding process or a cold molding process wherein the foaming takes place in a closed mold. After the foam has cured, the mold is opened, and the flexible foam removed. An integral skin can be formed onto the surface of the foam in the mold. A film, fabric, leather or other coverstock can be inserted into the mold prior to introducing the reactive blend (iii), to produce a foam that has a desirable show surface.

Polyurethane foam formulations that contain a mixture of ethylene oxide-capped polypropylene oxides in accordance with the invention have been found to process well, especially in high water formulations as described herein above. Good processing herein refers to the ability of a foam formulation to consistently produce good quality foam in an industrial setting. Good processing is indicated by consistently uniform cell structure, complete mold filling, consistently good surface appearance, consistent foam density and consistency in foam physical properties as the foam is produced over time. The foam formulation tolerates small changes in operating temperatures, catalyst levels and other process conditions which often cause significant product inconsistencies in other high water foam formulations.

It is often preferred to crush the foam to open the cells. A high open cell content (at least 25% by number, preferably at least 50%) is usually beneficial for foams that are used in noise and vibration absorption applications.

Resilient, flexible foam is characterized in having a resiliency, as determined using the ASTM D-3574 ball rebound test, which measures the height a ball rebounds from the surface of the foam when dropped under specified conditions. Under the ASTM test, the foam exhibits a resiliency of at least 40%, especially at least 50%. The resilient, flexible foam of the present invention advantageously also has a density in the range of 2.0 to 10 pounds/cubic foot (pcf) (32-160 kg/m$^3$), preferably from 2.0 to 2.65 pounds/cubic foot (32-42 kg/m$^3$). Density is conveniently measured according to ASTM D 3574.

When the process of the present invention forms a resilient, flexible foam in a closed mold, the de-mold time is advantageously equal to or less than 55 seconds, preferably equal to or less than 50 seconds, more preferably equal to or less than 45 seconds, more preferably equal to or less than 40 seconds, and even more preferably equal to or less than 35 seconds.

The resilient, flexible foam of the present invention advantageously also have a compression set as determined according to ASTM D3574 of equal to or less than 25%, preferably equal to or less than 20%, and more preferably equal to or less than 15%. The resilient, flexible foam of the present invention advantageously also have a compression set of equal to or greater than 1%, preferably equal to or greater than 5%, and more preferably equal to or greater than 10%.

The resilient, flexible foam of the present invention advantageously also have low organic compounds emissions. Preferably the resilient, flexible foam of the present invention have a volatile organic compounds level (VOC) as determined by VDA 278 equal to or less than 250 microgram per gram (µg/gm), more preferably equal to or less than 150 µg/gm, more preferably equal to or less than 100 µg/gm, even more preferably equal to or less than 75 µg/gm. Preferably the resilient, flexible foam of the present invention have a fugitive organic gas level (FOG) as determined by VDA 278 of equal to or less than 500 µg/gm, more preferably equal to or less than 250 µg/gm, more preferably equal to or less than 150 µg/gm, and even more preferably equal to or less than 100 µg/gm.

The foams are particularly useful for noise and vibration-absorbing applications in vehicles, especially automobiles, such as, for example automotive seating and other automotive interior parts such as dash boards, headliners, instrument panels trim, underlays, and mats. Sound absorption performance of noise and vibration-absorbing applications, such as molded parts from the resilient, flexible polyurethane of the present invention, are typically measured by equipment such as an impedance tube, or what is generally referred to as reverberation chambers, in accordance with individual OEM specifications.

EXAMPLES

Comparative Examples A and B and Examples 1 to 4 comprise a formulated polyol blend reacted with a polymeric MDI. The polymeric MDI has an isocyanate content of about 32% by weight. The polyol blend and polymeric MDI are reacted on a high pressure impingement mixing machine equipped with a 50 cm by 50 cm by 5 cm test mold heated and also on various molds having different size and geometry. The mold temperatures vary between 55 to 75° C. The isocyanate index for Examples 1 to 4 vary between 55 and 80. After the foam has cured, the mold is opened, and the foam is removed from the mold. The de-mold time is the time, reported in seconds, from the injection of the reactive blend into the mold to when the foam is removed from the mold. The isocyanate: polyol mixing ratio by weight for each Examples 1 to 4 and Comparative Examples A and B are listed in Table 1.

For Comparative Example A and B and Examples 1 to 4 a formulated polyol blend (comprising polyols and other additives) is made from the following components. Amounts are given as weight % based on the total weight of the formulated polyol blend. In Table 1:

"Polyol-1" is a glycerine initiated propylene oxide and 15% ethylene oxide capped polyol having an equivalent weight of 2040 available as VORANOL™ CP 6001 Polyol from The Dow Chemical Company;

"Polyol-2" is a glycerine initiated propylene oxide and 14.5% ethylene oxide capped polyol having an equivalent weight of 1902 having a level of unsaturation less than 0.06 meq/g;

"Polyol-3" is a glycerine initiated polyol with ethylene oxide/propylene oxide mixed feed at 75/25 having an equivalent weight of 1675 available as VORANOL CP 1421 Polyol from The Dow Chemical Company;

"Polyol-4" is a sorbitol/glycerine initiated propylene oxide and 15% ethylene oxide capped polyol having a functionality of about 3.3 available as SPECFLEX™ NC 632 Polyol from The Dow Chemical Company;

"Polyol-5" is a propylene glycol initiated propylene oxide and 20.5% ethylene oxide capped polyol having an equivalent weight of 2025;

"Polyol-6" is a 3,3'-diamino-N-methyldipropylamine initiated propylene oxide and 17.5% ethylene oxide capped polyol having an equivalent weight of 1700;

"NIAX™ A-1" is a blowing catalyst comprising 70% Bis (N,N-dimethylaminoethyl)ether in dipropylene glycol available from Momentive Performance Materials;

"DMEA" is a catalyst N,N-dimethylethanolamine;

"JEFFCAT™ ZF 10" is a conventional blowing catalyst 2-[[2-[2-(dimethylamino)ethoxy]ethyl]methylamino]-ethanol available from Huntsman Chemical Company;

"DMEE" is a moderate cream catalyst dimethylaminoethoxyethanol;

"POLYCAT™ 15" is a catalyst that promotes surface cure N,N,N',N",N"-pentamethyldipropylenetriamine available from Air Products;

"DABCO™ DC-1" is a tertiary amine/organotin curing catalyst available from Air Products;

"DABCO DC 5164: is a high efficient cell stabilizing silicon surfactant available from Air Products;

"TEGOSTAB™ B 8715 LF 2" is a low fogging, cell regulating silicon surfactant available from Goldschmidt Gmbh;

"TEGOSTAB B 8734 LF 2" is a low fogging, medium efficient cell regulating silicon surfactant available from Goldschmidt Chemical Corp.; and "NIAX Silicone L-2171" is a high efficient cell stabilizing silicone surfactant available from OSi Specialties.

Figure 1:
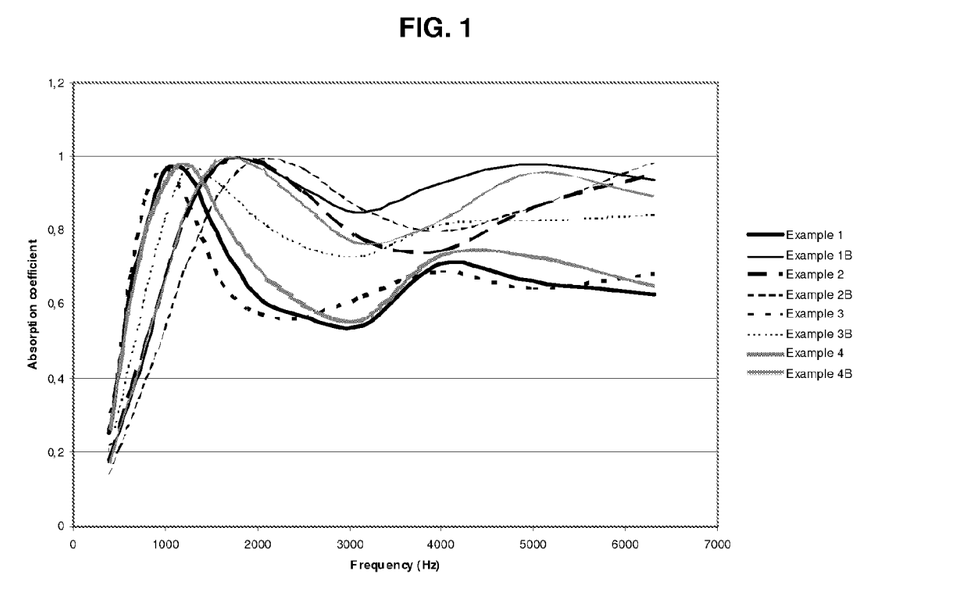
FIG. 1 is a plot of absorption coefficient versus frequency for Examples 1 to 4.
Figure 2:
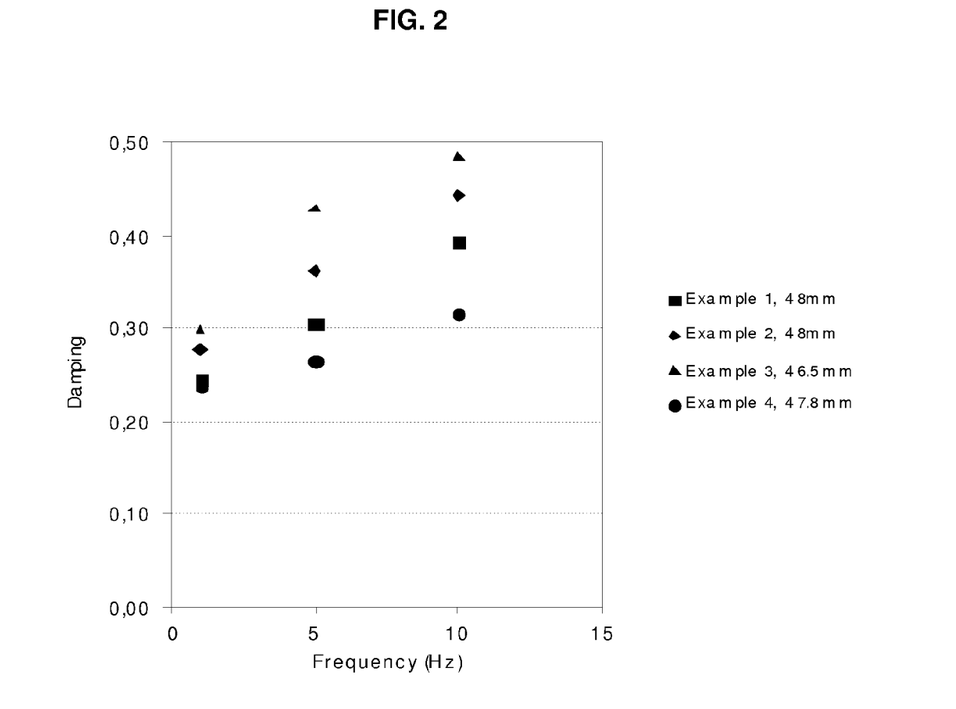
FIG. 2 is a plot of dampening versus frequency for Examples 1 to 4.
Figure 3:
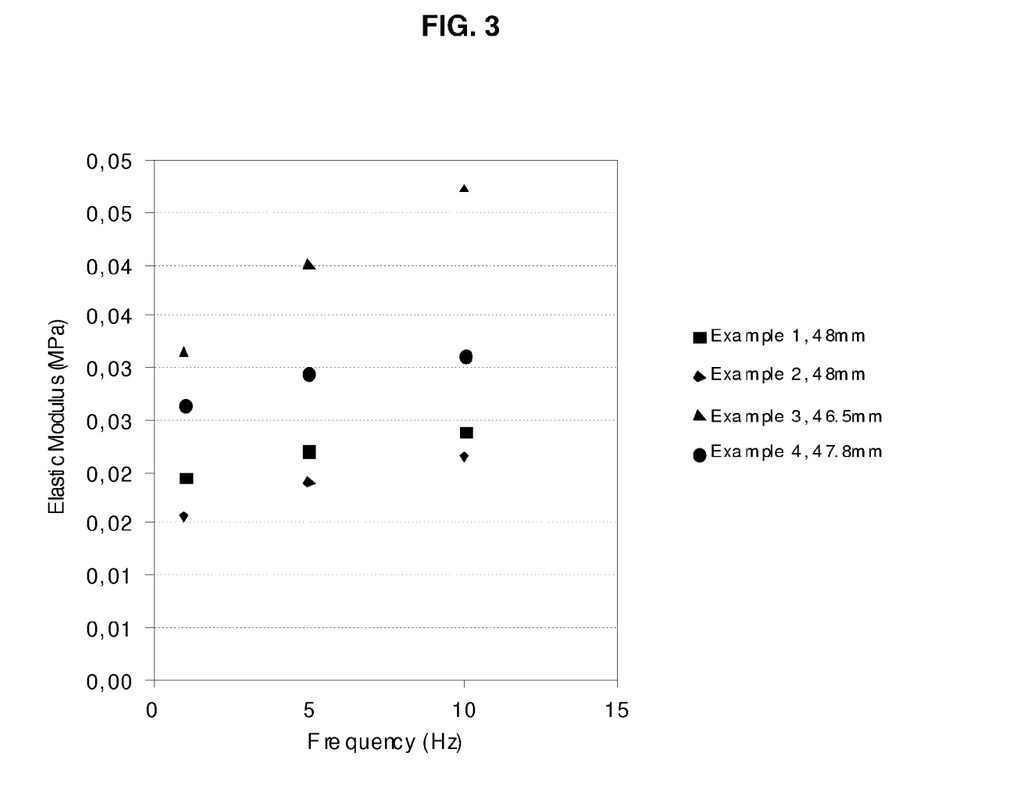
FIG. 3 is a plot of elastic modulus versus frequency for Examples 1 to 4.

Properties for the resultant foams from the formulated polyol mixtures of Comparative Examples A and B and Example 1 are provided in Table 1. In Table 1:

"Density" is determined according to ASTM D3574 and is reported in kg/m$^3$;

"De-mold Time" is reported in seconds;

"Emissions" are determined according to VDA 278 and reported in micrograms/gram (μg/gm) for volatile organic compounds (VOC) and fugitive organic gas (FOG);

"Tensile Strength" is determined according to ASTM D3574 and reported in kPa;

"Elongation" is tensile elongation at break and is determined according to ASTM D3574 and is reported in %;

"Compression Set: is determined according to ASTM D3574 and is reported in %;

"Load Deflection" is compression load deflection determined according to ASTM D3574 and reported in kPa;

"Absorption coefficient" is determined on impedance tube according to ASTM C384 and results presented in FIG. 1, in FIG. 1, lines designated with a "B" represent the absorption coefficient determined on the foam when its skin is away from the sound source, lines with no designation represent the absorption coefficient determined on the foam when its skin is towards the sound source;

"Damping" is determined according to ASTM E756 and the results at the thickness of the sample tested are reported in FIG. 2; and "E-Modulus" is determined according to ASTM E756 and the results at the thickness of the sample tested are reported in MPa, results are shown in FIG. 3.

The examples of the present invention demonstrates a good blend of physical properties, sound absorption performance with VOC and FOG levels which are below industry standards.

TABLE 1

|  | Comparative Example | | Example | | | |
| --- | --- | --- | --- | --- | --- | --- |
|  | A | B | 1 | 2 | 3 | 4 |
| ISOCYANATE:POLYOL, by wt | 100:55 | 100:60 | 100:60 | 100:65 | 100:70 | 100:75 |
| Isocyanate Index | 74 | 74 | 62 | 68 | 73 | 78 |
| POLYOL BLEND COMPOSITION | | | | | | |
| Polyol-1 | 65.18 | 76.45 | | | | |
| Polyol-2 | | | 69.60 | 69.60 | 69.60 | 69.60 |
| Polyol-3 | 3.50 | 5.00 | 3.00 | 3.00 | 3.00 | 3.00 |
| Polyol-4 | 25.00 | 10.00 | 11.00 | 11.00 | 11.00 | 11.00 |
| Polyol-5 | | 3.00 | 4.00 | 4.00 | 4.00 | 4.00 |
| Polyol-6 | | | 4.00 | 4.00 | 4.00 | 4.00 |
| NIAX A-1 | 0.10 | | | | | |
| DMEA | | 0.75 | 0.75 | 0.75 | 0.75 | 0.75 |
| JEFFCAT ZF 10 | | 0.25 | 0.40 | 0.40 | 0.40 | 0.40 |
| DMEE | 0.30 | | | | | |
| POLYCAT 15 | 0.50 | 0.25 | 0.55 | 0.55 | 0.55 | 0.55 |
| DABCO DC-1 | 0.12 | | | | | |
| DABCO DC 5164 | | | 0.40 | 0.40 | 0.40 | 0.40 |
| TEGOSTAB B 8715 LF 2 | 0.70 | | | | | |
| TEGOSTAB B 8734 LF 2 | | 0.30 | 0.40 | 0.40 | 0.40 | 0.40 |
| NIAX Silicone L-2171 | | | | | | |

TABLE 1-continued

|  | Comparative Example | | Example | | | |
| --- | --- | --- | --- | --- | --- | --- |
|  | A | B | 1 | 2 | 3 | 4 |
| Glycerine |  |  | 0.20 | 0.20 | 0.20 | 0.20 |
| Water | 4.60 | 5.00 | 5.70 | 5.70 | 5.70 | 5.70 |
| PROPERTIES |  |  |  |  |  |  |
| Density, kg/m$^3$ | 50-60 | 40-45 | 36-42 | 36-42 | 36-42 | 36-42 |
| De-mold Time, s | 70-90 | 50-55 | 30-45 | 30-45 | 30-45 | 30-45 |
| Emissions, μg/gm |  |  |  |  |  |  |
| VOC |  |  |  |  |  | 52 |
| FOG |  |  |  |  |  | 76 |
| Tensile Strength, kPa | 116 | 103 | 101 | 121 | 111 | 147 |
| Elongation, % | 70 | 87 | 77 | 80 | 68 | 78 |
| Compression Set, % | 6 | 8 | 11 | 11 | 11 | 11 |
| Load Deflection, kPa | 5 | 4 | 3 | 5 | 6 | 6 |

The invention claimed is:

1. A process for producing a resilient, flexible polyurethane, comprising the steps of:
   a providing a polyol blend (i) comprising:
   i.a from 5 to 70 weight % of a polyol mixture (i.a) comprising ethylene oxide-capped polypropylene oxides each having a hydroxyl equivalent weight of from 1200 to 3000 and containing at least 70% primary hydroxyl groups, wherein from 5 to 80% by weight of the ethylene oxide-capped polypropylene oxides are nominally difunctional, from 0.5 to 20% by weight of the ethylene oxide-capped polypropylene oxides have a nominal functionality of four or higher, and the balance of the ethylene oxide-capped polypropylene oxides, but not less than 1.5% by weight thereof, are nominally trifunctional;
   i.b from 1 to 20 weight % of one or more autocatalytic polyol compound (i.b) having a functionality in the range of 2 to 8 and a hydroxyl number in the range of 15 to 200, wherein said autocatalytic polyol compound comprising at least one tertiary amine group, and said autocatalytic polyol being an amine initiated polyol obtained by alkoxylation of at least one initiator molecule selected from the group consisting of 3,3'-diamino-N-methyldipropylamine, 2,2'-diamino-N-methyldiethylamine, 2,3-diamino-N-methyl-ethyl-propylamine, or a mixture thereof;
   i.c from 25 to 80 weight % of a low unsaturation polyol (i.c) having a functionality equal to or greater than 2, a hydroxyl equivalent weight of from 1800 to 2800, and a total unsaturation value of equal to or less than 0.06 meq/g;
   wherein weight percents are based on the total weight of the polyol blend (i);
   b providing one or more organic polyisocyanate (ii);
   c forming a reactive blend (iii) by continuously merging said polyol blend (i) and said organic polyisocyanate (ii) in the presence of a blowing agent and, optionally, one or more additive;
   and
   d subjecting the resulting reactive blend (iii) to conditions sufficient to cure the reactive blend to form a resilient, flexible polyurethane foam.

2. The process of claim 1 comprising the polyol blend (i) wherein:
   (i.a) is present in an amount of from 15 to 70 weight %;
   (i.b) is present in an amount of from 4 to 10 weight %; and
   (i.c) is present in an amount of from 40 to 70 weight %.

3. The process of claim 1 wherein the ethylene oxide-capped polypropylene oxides of the polyol mixture (i.a) each have a hydroxyl equivalent weight of from 1700 to 2200 and a nominal functionality of from 6 to 8.

4. The process of claim 1 wherein the initiator molecule in the autocatalytic polyol compound (i.b) is 3,3'-diamino-N-methyldipropylamine.

5. The process of claim 1 wherein the low unsaturation polyol (i.c) has a total unsaturation value equal to or less than 0.04 meq/g.

6. The process of claim 1 wherein the blowing agent is water.

7. The process of claim 1 wherein the resilient, flexible polyurethane foam has a density as determined by ASTM D3574 of equal to or less than 42 kg/m$^3$.

8. The process of claim 1 further comprises the steps
   c.1 foaming the reactive blend (iii) in a closed mold;
   e opening the closed mold, and
   f removing the resilient, flexible polyurethane foam,
   wherein step c.1 occurs after step c and before step d and steps e and f occur sequentially after step d, such that the resilient, flexible polyurethane foam has a de-mold time of at most 55 seconds.

9. The process of claim 1 wherein the resilient, flexible polyurethane foam has a compression set as determined by ASTM D3574 of equal to or less than 15%.

10. The process of claim 1 wherein the resilient, flexible polyurethane foam has a volatile organic compounds level (VOC) of equal to or less than 100 μg/gm and a fugitive organic gas level (FOG) of equal to or less then 250 μg/gm, VOC and FOG values determined according to VDA 278.

11. The process of claim 1 wherein the resilient, flexible polyurethane foam is used in an automobile noise and vibration-absorbing application.

* * * * *